United States Patent [19]  [11] 3,977,142
Dove et al.  [45] Aug. 31, 1976

[54] FLOOR NAIL

[75] Inventors: Allan B. Dove, Hamilton; Allen C. Hunsberger, Waterdown, both of Canada

[73] Assignee: The Steel Company of Canada, Limited, Hamilton, Canada

[22] Filed: July 7, 1975

[21] Appl. No.: 593,318

Related U.S. Application Data

[63] Continuation-in-part of Ser. No. 454,595, March 25, 1974.

[52] U.S. Cl. ............................ 52/363; 52/362; 52/727; 85/20; 52/729
[51] Int. Cl.² ........................ E04C 3/16; E04B 5/52
[58] Field of Search............... 52/727, 758 D, 729, 52/759, 363, 364, 361; 85/20, 44, 28; 16/2

[56] References Cited
UNITED STATES PATENTS

| | | | |
|---|---|---|---|
| 1,953,592 | 3/1947 | Deniston | 16/2 |
| 2,558,379 | 6/1951 | Phipard, Jr. | 85/20 |
| 2,605,867 | 8/1952 | Goodwin | 52/729 |

FOREIGN PATENTS OR APPLICATIONS
581,761  1958  Italy ........................................ 85/20

*Primary Examiner*—Ernest R. Purser
*Assistant Examiner*—Robert C. Farber
*Attorney, Agent, or Firm*—Sim & McBurney

[57] ABSTRACT

This invention provides a fastener which includes a shank having a head on one end and a conical portion on the other, the apex of the conical portion constituting a piercing point for the fastener. The shank includes a smooth cylindrical portion adjacent the conical portion and a threaded portion adjacent the head. The axial section of the fastener exhibits an abrupt, angled transition between the conical portion and the smooth cylindrical portion. The thread diameter of the threads on the threaded portion is greater than the diameter of the smooth cylindrical portion, which is the same as the base diameter of the conical portion. The thread angle of the threads is between about 35° and about 55°, and the included cone angle of the conical portion is between about 23° and about 35°.

4 Claims, 6 Drawing Figures

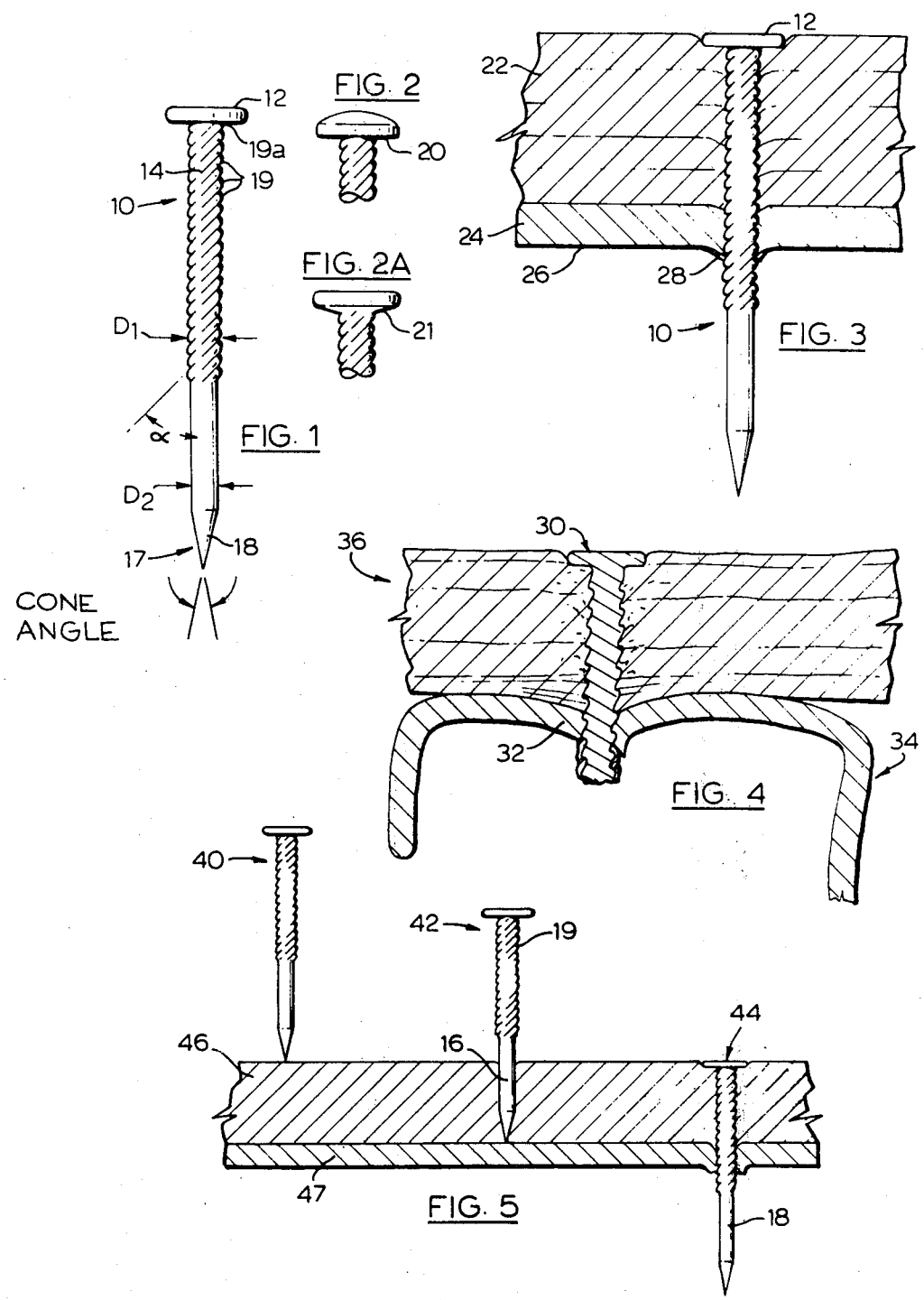

FLOOR NAIL

This application is a continuation-in-part of U.S. self-drilling tapping screws as compared to an identical wood system. The following table shows the comparative time required to install the subfloor in the steel system and the wood system.

| STEEL: | | Move Material | Cut Material | Fasten Material | Misc. | Total | |
|---|---|---|---|---|---|---|---|
| | 1st Floor | 10.0 | 11.4 | 226.0 | — | 247.4 | |
| | 2nd Floor | 54.5 | 33.5 | 253.7 | — | 341.7 | |
| | Total | 64.5 | 44.9 | 479.7 | — | 589.1 = | 9.8 hrs. |

| WOOD: | | Move Material | Cut Material | Fasten Material | Misc. | Total | |
|---|---|---|---|---|---|---|---|
| | 1st Floor | 10.0 | 11.0 | 94.0 | 2.0 | 117.0 | |
| | 2nd Floor | 55.0 | 15.0 | 154.0 | — | 224.0 | |
| | Total | 65.0 | 26.0 | 248.0 | 2.0 | 341.0 = | 5.7 hrs. | application Ser. No. 454,595, filed on Mar. 25th, 1974.

This invention relates generally to a fastener element, and has to do particularly with a fastener element which is adapted to attach a first layer to a second layer. More particularly, this invention has to do with a fastener element especially suited for attaching rigid sheet material such as plywood flooring to metallic floor joists such as steel floor joists.

Recently, steel floor joists have been developed for use in the construction industry. Such joists, forming part of the sub-floor, are not solid members but rather are formed usually in a C-shape. Floor plating materials, such as plywood sheets, are then fastened to the upper flat surface of the C-shaped joists. The actual thickness of the steel in the joist is relatively thin, and can be pierced by certain high-strength fastening members, such as the heat-treated spiral shanked Ardox (trade mark) nails, or by the conventional self-drilling tapping screws used with an automatic depth setting screwgun.

When the steel floor joist was initially developed, one of the most critical problems to be overcome was that of squeaking floors, particularly when plywood flooring was used. The heat-treated spiral shanked nails mentioned above are generally incapable of clamping the plywood tightly enough and holding it sufficiently securely to prevent squeaking. In section, the Ardox nail is usually square or octagonal, with the corners of the section winding helically about the axis of the nail. Thus the corners of such a nail are not really "threads" in the ordinary meaning of that word. It is thought that the inability of the Ardox nail to clamp the plywood sufficiently tightly is related to the large lead of the helically progressing corners of the section, as well as by the fact that the holding becomes frictional rather than by the threading of the nail into the joist.

The self-drilling tapping screws used with the common screwgun appear to function satisfactorily, because the screw drills itself through the steel of the joist and then the threads pull the plywood down tightly against the joist. Although this method is being presently used and results in a satisfactory flooring with minimal squeaking, it has the disadvantage that the screws must be manually placed in the screwgun one at a time and then drilled into the joist. This operation takes approximately twice as much time as the hand-nailing of plywood to wooden joists.

Recently, a department of the applicant company has performed a time study of a steel floor joist system with The foregoing table makes it evident that the length of time taken to apply a subfloor with a steel joist system is almost twice as great as the length of time for wooden system. In view of this fact, it is obvious that the cost of applying a subfloor in a steel joist system could be significantly reduced if the length of time taken to apply the subfloor could be brought closer to that required for a wooden system.

AIMS OF THIS INVENTION

In view of the foregoing, this invention addresses itself to the provision of a fastening element which, when used with a steel joist system, may considerably accelerate the process of applying a subfloor.

This invention further addresses itself to the provision of a fastener which has clamping characteristics similar to that of self-drilling tapping screws, but which can be applied in a shorter time and at a correspondingly reduced cost.

This invention further addresses itself to the provision of a fastening member capable of manual driving and which is capable of securing plywood to a steel joist with minimum squeaking.

This invention further addresses itself to the provision of a fastening element which not only satisfies the preceding desiderata, but which is also capable of use in a pneumatic or power nailer.

Accordingly, this invention provides a fastener which includes a shank having a head on one end and a conical portion on the other, the apex of said portion constituting a piercing point for the fastener, the conical portion having a base diameter, the shank including a smooth cylindrical portion adjacent the conical portion, and a threaded portion adjacent the head, the axial section of the fastener exhibiting an abrupt, angled transition between the conical portion and the smooth cylindrical portion, the threaded portion having threads of which the outer thread diameter is greater than the diameter of said smooth cylindrical portion, the latter being the same as the base diameter of said conical portion, the thread angle of said threads being between about 35° and about 55°, such that the fastener is self-tapping and self-threading, the included cone angle of said conical portion being between about 23° and about 35°.

This invention also provides, in combination: a metal joist layer having a first thickness, a panel layer having a second thickness and juxtaposed in contact with and against said metal joist layer, and a fastener including a shank having a head on one end and a conical portion on the other, the apex of said portion constituting a piercing point for the fastener, the conical portion having a base diameter, the shank including a smooth cylindrical portion adjacent the conical portion, and a threaded portion adjacent the head, the axial section of the fastener exhibiting an abrupt, angled transition between the conical portion and the smooth cylindrical portion, the threaded portion having threads of which the outer thread diameter is greater than the diameter of the smooth cylindrical portion, the latter being the same as the base diameter of said conical portion, the thread angle of said threads being between about 35° and about 55°, such that the fastener is self-tapping and self-threading, the included cone angle of said conical portion being between about 23° and about 35°.

GENERAL DESCRIPTION OF THE DRAWINGS

Three embodiments of this invention are illustrated in the accompanying drawings, in which like numerals denote like parts throughout the several views, and in which:

FIG. 1 is an elevational view of a fastener element constructed in accordance with the first embodiment of this invention;

FIGS. 2 and 2A are partial elevational views of a fastener element in accordance with the second and third embodiments of this invention respectively;

FIG. 3 is a sectional view through a flooring-and-joist combination, showing the two components of the flooring secured together by a fastener element constructed in accordance with the first embodiment of this invention;

FIG. 4 is a tracing made from a photograph of a polished section through an actual test sample in which a fastener constructed in accordance with the first embodiment of this invention is driven through and holds together a layer of plywood sub-floor and a metal joist, the polished section being taken through the fastener as well as through the two layers; and FIG. 5 is a sectional view similar to FIG. 3, on a smaller scale, showing three stages in the application of the fastener constructed in accordance with the first embodiment of this invention.

PARTICULAR DESCRIPTION OF THE DRAWINGS

Referring to FIG. 1 of the drawing, the fastener element 10 is seen to include a head 12, a first shank portion 14, a second shank portion 16 and a piercing point 17. The piercing point 17 is in effect the apex of a conical portion 18 located adjacent the second shank portion 16.

As can be seen, the first shank portion 14, has helical threads 19 with a thread angle $\alpha$ of substantially 45°, although this angle is not considered to be critical.

Depending upon the size of each thread, there may be from 6–10 separate threads around the first shank portion 14, although again this is not critical. In the particular embodiment illustrated there are eight separate threads around the first shank portion 14.

As seen in FIG. 1, the second shank portion 16 is smoothly cylindrical.

If desired, the entire fastening element may be case hardened by conventional techniques to give it increased strength in order to ensure that it will pierce the steel joist layer.

The threads in the first shank portion 14 of the shank may be relatively rough or rounded threads, as they are not intended to engage an internally threaded, pretapped member. Threads commonly known as "U" type threads may be utilized.

It is essential to this invention that the outside diameter D1 of the threads 19 in the first shank portion 14 be greater than the external diameter D2 of the conical second shank portion 16. The minimum thread diameter (i.e. the diameter measured at the "trough" of the thread) is not critical, but ordinarily would be slightly less than the diameter D2, since this would be the natural result of the standard rolling technique by which threads are rolled into an extruded length of nail stock.

The head 12 of the first embodiment of this invention, shown in FIG. 1, is a plain flat head, and a fillet 19a is provided under the head 12.

As can be seen in the figures, the conical portion 18 is substantially a true cone, and there is an abrupt, angled transition at the base of the conical portion 18 from a conical configuration to a cylindrical configuration. Furthermore, the actual cone angle of the conical portion 18 (i.e., the angle which, if rotated about its bisector, would yield the cone) is shown in FIG. 1 to be about 25°. It is considered essential that this cone angle be located within the range from about 23° to about 35°, for reasons which will be dealt with hereinafter. FIGS. 1 and 3 of the drawings of this case illustrate a cone angle of 25° and 23° respectively, while the middle fastener in FIG. 5 has an illustrated angle of about 27°.

FIG. 2 shows the second embodiment of this invention, which differs from the first embodiment only in that the head 20 of the second embodiment is rounded at its upper surface.

The third embodiment of this invention is shown in FIG. 2A, and differs from the first embodiment only in that it includes a countersink 21 under the flat-topped head.

FIG. 3 shows tha fastening element of the first embodiment of this invention in tight engagement with plywood flooring shown in section at 22 and with the upper plate 24 of a steel joist member, also shown in section.

The fastening element 10 in FIG. 3 has been driven either manually or mechanically into the tight engagement shown. It will be seen that the lower surface 26 of the steel joist plate 24 has a rough edge portion 28 where the piercing has taken place, and it will also be noted that the head 12 of the fastening element 10 has been driven down to a slight crushing engagement with the plywood flooring sheet 22, so that the latter may be held in tight, non-squeaking engagement with the joist plate 24.

Attention is now directed to FIG. 4, which, as stated earlier, is copied from an actual photograph of a polished section through a joint utilizing the fastener of the first embodiment of this invention.

The section through the fastener shown at 30 is not an axial section, but is taken through a plane spaced slightly from the central axis of the fastener. It will be noted that the upper plate 32 of the joist 34 has been bent and deformed downwardly by the pressure of the fastener 30 during its forced insertion. It will also be noted that the threads of the fastener 30 have in fact simultaneously taped the plate 32 and threaded themselves through the plate 32, so that there is a positive engagement of the threads with the tapped hole through the plate 32. The same tapping and theading takes place in the plywood layer 36, as can be seen.

While the cylindrical shank portion 16 has been shown in FIG. 1 to be of a substantial length as compared to the conical portion 18, the particular length or ratio of lengths is not considered to be critical. It is considered that the fastener should widen progressively from the piercing point 17 to a substantially smooth and round section before the threads 19 begin. The reason for this latter requirement relates to the necessity of first "punching" or piercing a substantially round hole in the layer prior to the point in time when the self-threading and self-tapping threads 19 come into contact with the pierced hole. Thus, the action of the fastener is two-fold: firstly a hole is "punched" or pierced by the pointed end (on which no threads are formed), and secondly that punched or pierced hole is tapped by the self-threading threads 19 as the fastener screws itself into the pierced or punched hole. It is obvious that the fastener will undergo some rotation about its axis during that portion of the driving operation when the threads 19 are in contact with at least one of the layers.

FIG. 5 shows three fasteners 40, 42 and 44, at different stages of being driven through a double layer constituted by a plywood sub-flooring layer 46 and a metal joist layer 47.

The fastener 40 is simply shown in position for a first driving blow in a hand-driving operation with a standard hammer.

Fastener 42 is shown after the first blow of the hammer, the latter being assumed sufficient to drive the fastener through the plywood sub-floor layer 46 so that the piercing point ends up close to or touching the upper surface of the metal joist layer 47. It will be noted that the length of the fastener 42 from the piercing point to the beginning of the threads 19 (i.e. including the smooth cylindrical portion 16) is substantially the same as or only slightly larger than the thickness of the plywood sub-floor layer 46. Naturally, since there are no threads on the smooth cylindrical portion 16 of the shank of the fastener 42, the fastener 42 does not undergo any rotation and is not subject to rotational forces during this first hammer blow. The second hammer blow is intended to be of sufficient force to drive the fastener into the position of fastener 44 in FIG. 5. During the second hammer blow, the point pierces the metal joist layer 47, and the smooth cylindrical portion 16 establishes a relatively smooth pierced hole in the metal joist layer 47 prior to the engagement of the threads 19 with that pierced hole. It will be clear that, over most of the movement of the fastener 44 during the second hammer blow, the threads 19 will be in engagement with at least one layer. The threads first come into engagement with the plywood sub-floor layer 46, and this begins rotational movement of the fastener during its descent. This means that, by the time the threads come into contact with the metal joist layer 47, the fastener is already rotating to some extent, and this will aid the process of self-tapping which occurs between the threads and the metal joist layer 47.

Conversely, if the threads 19 were to extend all the way down to the base of the conical portion 18 of the fastener 44, such threads would come into contact with the metal joist layer 47 almost immediately after the initial impact of the hammer in the second hammer blow, and this could mean that the fastener 44 would not have had sufficient time to begin rotating before this engagement takes place. This would mean that the threads could be forced through the pierced hole in the metal joist layer 47 during the initial non-rotating movement of the fastener, and this could tend to "strip" the threads through the pierced hole in a manner similar to a reaming action, as opposed to a rotational tapping movement through the metal joist layer 47.

Furthermore, if the threads 19 were to extend all the way down to the base of the conical portion 18 of the fastener 44, the threads would be forced through the pierced hole in the metal joist layer 47 without the benefit of the bell-like curved portion of the joist layer which is shown immediately surrounding the shank of the fastener in FIG. 4. The piercing point and the cylindrical portion of the fastener ordinarily create this bell-like portion prior to the engagement of the threads therewith, and it is believed that the gradual engagement thereby afforded improves the threading action of the threads through the metal joist layer 47.

It can thus be seen that, for a particular application in which a relatively thick and relatively soft layer is to be fastened to a relatively thin and relatively hard underlayer, the provision of the unthreaded substantially smooth cylindrical portion 16 of the shank of the fastener provides an additional advantage, so long as the length of the fastener from the piercing point to the beginning of the thread is about the same as the thickness of the relatively soft and relatively thick layer. Naturally, this portion of the fastener can be considerably longer than the thickness of the last-mentioned layer, but this additional length of the smooth portion would be essentially wasted. Furthermore, it is essential that the threaded portion of the fastener be long enough to be able to extend through both layers, as shown with fastener 44 in FIG. 5. Thus, to permit the shortest workable fastener length for a given application with a first thickness of metal joist layer and a second thickness of a comparatively soft panel layer, the length of the threaded portion of the fastener must be at least as great as the combined first and second thicknesses just mentioned, while the length of the fastener from the point to the beginning of the threads should be long enough that, during the second hammer blow described above with reference to FIG. 5, the fastener will begin to rotate before the threads engage the pierced hole in the metal sub-layer.

A brief theoretical discussion is in order, relating to the importance of the cone angle range stipulated above, namely from about 23° to about 35°, and the importance of having an abrupt, angled transition from the conical portion to the smooth cylindrical portion.

Experience is shown that, if the included cone angle of the conical point of the fastener of this invention were to be appreciably larger than the range stipulated above, for example something on the order of 45° or 55°, the fastener simply would not function as it should. If such a large cone angle were utilized, there would tend to be less piercing and more tearing of the underlying metal joist wall, and moreover the metal joist wall would tend to be pulled downwardly too far away from its original flat position, and would not "spring back" sufficiently to grip and bind against the threads of the fastener. While some downward distortion of the metal wall is permissible, as shown in FIG. 4, an excessive amount of downward distortion will simply destroy the grip between the metal and the fastener. A further difficulty with a fastener in which the included cone angle of the piercing point were too great relates to a tendency on the job to occasionally angle the fastener through the material being pierced, such that the fastener does not strike the underlying metal joist perpendicularly. When this occurs, with too large a cone angle, there would be a definite tendency for the point to bend over and to skid along the joist, likely failing completely to puncture the same.

Conversely, if the cone angle were too small, i.e. appreciably below the range of 23° to 35° stipulated earlier, it is clear that the point would simply have insufficient strength to accomplish the job of piercing that is called for.

With regard to the abrupt, angled transition between the conical piercing point and the smooth cylindrical shank portion immediately adjacent the piercing point, there is at least one specific advantage which this construction attains. By having the actual entering point widened out conically to its maximum diameter at a location fairly close to the conical point itself, all of the "cold working" of the underlying metal joist layer as it is being pierced will take place very early in the movement of the fastener. As soon as the beginning of the smooth cylindrical portion of the shaft reaches the underlying metal joist layer, no further distortion or cold working of the metal takes place until the threaded portion arrives and begins to cut threads. The special advantage of this construction is best understood when compared to an alternative construction not within the ambit of this invention, namely a bullet-shaped piercing point and nose portion. If a bullet-shaped piercing point were given the same apex cone angle as that illustrated, described and claimed in this disclosure, the portion of the fastener between the piercing point and the threaded portion which is taken up by the gradual increase of the pierced hole to the maximum diameter would have to be greater than that of the construction disclosed herein. This would mean that the cold working of the metal would have to take place over a longer period of time than with the instant construction. When a hammer is used manually to insert the fastener of this invention, most or all of the energy in the swinging hammer head is transferred to the fastener at the instant of the hammer blow, i.e. while contact exists between the hammer of the fastener. With the fastener construction of this application, most or all of this transferred energy (a "lump" of energy, so to speak) is transferred to the fastener during the time when the piercing point of the fastener is doing the greatest amount of work per unit time, namely cold working the underlying metal joist layer by piercing a hole therethrough. The greater the fastener length taken up with the expansion from the piercing point to the final diameter of the smooth cylindrical portion, the more likelihood there is that the piercing or punching of the initial hole would not be terminated by the time contact between the hammer and the fastener ceased. In the specific case of a bullet shaped fastener point, it is thus more likely that the underlying metal joist layer would still be in the process of distorting after the initial "lump" of energy had been transferred from the hammer to the fastener.

A number of failure tests have been carried out with the fastener of this invention, the details of two of which will now be given in detail.

In the first set of tests, a piece of one-half inch plywood was hand-nailed to a 0.060 inch steel joist, with a washer around the fastener to distribute the load over a broader area. The fastener in all tests measured exactly 1¾ inches from the piercing point to the underside of the head, and relative dimensions were as shown in FIGS. 1 and 5 of the drawings. The fastener was case-hardened, phosphate treated, had eight separate threads, and had a thread angle of 45°.

The following are the results of failure tests on five separate fasteners, the failure test being carried out by pulling the plywood away from the joist at a loading rate of 5 inches per minute, thereby to determine the failure load for the nail in the steel joist.

| Test No. | Failure Load (lbs.) | Remarks |
|---|---|---|
| 1 | 750 | Nail pulled straight out no rotation. |
| 2 | 775 | Nail pulled straight out no rotation. |
| 3 | 740 | Nail pulled out with slight rotation. |
| 4 | 770 | Nail pulled out with about 10° rotation. |
| 5 | 760 | Nail pulled straight out no rotation. |

Average failure load - 759 lbs.

The second set of tests was identical to that set forth above, except that the joist had a thickness of 0.075 inches. The size, condition and shape of the fastener is the same, as is the loading rate.

| Test No. | Failure Load (lbs.) | Remarks |
|---|---|---|
| 1 | 740 | Plywood failed by cracking down the middle at the nail. |
| 2 | 770 | Plywood failed by cracking down the middle. |
| 3 | 710 | Plywood failed by cracking down the middle. Nail almost came out, but did not rotate. |
| 4 | 865 | No plywood failure. Nail rotated slightly. |
| 5 | 870 | Plywood pulled over washer and nail. Nail came out about 1/16 inch. |

Average failure load - 791 lbs.

It will be noted that failure for the joist of thickness 0.060 inches involved the nail pulling out of the joist either with or without rotation. By comparison, the failure for the joist of thickness 0.075 inches involved, in all but one case, failure in the plywood rather than in the grip between the nail and the joist. It will be particularly noted that, with the 0.075 inch joist, the dislodgment of that grip required loads greater than 865 lbs. in two instances. By comparison, with the joist of thickness 0.060 inches, the grip was dislodged in each case by application of a load not greater than 775 lbs.

This suggests that the load required to dislodge the grip of a hand-nailed phosphate treated fastener of the foregoing relative and absolute dimensions in a 0.060 inch steel joist is in the area of about 750 lbs., while the load required for a 0.075 inch joist is in the area of 860 lbs. It is assumed that Test No. 3 for the 0.075 inch joist was an exception in that the grip between the nail and the joist was considerably weaker than in the other four tests on the same thickness of joist.

The foregoing failure loads are extremely high when compared with the normal expected failure load of a 2 inch common nail in a wood joist, the latter being about 150 lbs.

It is believed that the higher pull-out values of the fastener for the 0.075 inch joist, as compared to the 0.060 inch joist, is related to the fact that the "lips" which are deformed downwardly by the piercing point and smooth cylindrical portion of the fastener are stiffer in the 0.075 inch joist because they are thicker. These "lips" are what are threaded, and because the 0.075 inch lips are stiffer they offer more resistance to the cutting force of the threads, and hence are cut deeper.

While a thread angle of 45° has been referred to in this specification as providing satisfactory results, it is considered that thread angles in the general range from about 35° to about 55° may be utilized without altering the basic characteristics or grip strength of the fastener.

What we claim is:

1. A fastener which includes a shank having a head on one end and a conical portion of circular section on the other, the apex of said portion constituting a piercing point for the fastener, the conical portion having a base diameter, the shank including a smooth cylindrical portion adjacent the conical portion, and a threaded portion adjacent the head, the axial section of the fastener exhibiting an abrupt, angled transition between the conical portion and the smooth cylindrical portion, the threaded portion having threads of which the outer thread diameter is greater than the diameter of said smooth cylindrical portion, the latter being the same as the base diameter of said conical portion, the thread angle of said threads being between about 35° and about 55°, such that the fastener is self-tapping and self-threading, the included cone angle of said conical portion being between about 23° and about 35°.

2. The fastener claimed in claim 1, in which the thread angle is substantially 45°, and in which the number of separate threads is between six and ten inclusive.

3. In combination:
a metal joist layer having a first thickness,
a panel layer having a second thickness and juxtaposed in contact with and against said metal joist layer,
and a fastener passing through both layers, said fastener including a shank having a head on one end and a conical portion of circular section on the the other, the apex of said portion constituting a piercing point for the fastener, the conical portion having a base diameter, the shank including a smooth cylindrical portion adjacent the conical portion and a threaded portion adjacent the head, the axial section of the fastener exhibiting an abrupt, angled transition between the conical portion and the smooth cylindrical portion, the threaded portion having threads of which the outer thread diameter is greater than the diameter of the smooth cylindrical portion, the latter being the same as the base diameter of said conical portion, the thread angle of said threads being between about 35° and about 55°, such that the fastener is self-tapping and self-threading, the included cone angle of said conical portion being between about 23° and about 35°.

4. The combination claimed in claim 3, in which the length of the fastener from the piercing point to the junction of the threaded portion with the smooth cylindrical portion is substantially the same as said second thickness, the length of the threaded portion of the fastener being at least as great as the combined first and second thicknesses, the fastener securing said layers together with its head against the panel layer remote from the metal joist layer and with said threaded portion extending through both said layers, the thread angle being substantially 45°.

* * * * *